(12) United States Patent
Ovchinnikov (10) Patent No.: US 10,297,358 B2
(45) Date of Patent: May 21, 2019

(54) BEAM SPLITTERS

(71) Applicant: The Secretary of State for Business, Innovation & Skills, London (GB)

(72) Inventor: Yuri Borisovich Ovchinnikov, Teddington (GB)

(73) Assignee: NPL Management Limited, Teddington (GB)

( * ) Notice: Subject to any disclaimer, the term of this patent is extended or adjusted under 35 U.S.C. 154(b) by 78 days.

(21) Appl. No.: 15/317,870

(22) PCT Filed: Jun. 10, 2015

(86) PCT No.: PCT/GB2015/051705
§ 371 (c)(1),
(2) Date: Dec. 9, 2016

(87) PCT Pub. No.: WO2015/189614
PCT Pub. Date: Dec. 17, 2015

(65) Prior Publication Data
US 2018/0211739 A1 Jul. 26, 2018

(30) Foreign Application Priority Data

Jun. 10, 2014 (GB) .................................. 1410298.2
Sep. 12, 2014 (GB) .................................. 1416142.6

(51) Int. Cl.
*G21K 1/00* (2006.01)
*G21K 1/06* (2006.01)
(Continued)

(52) U.S. Cl.
CPC .............. *G21K 1/006* (2013.01); *G01C 19/02* (2013.01); *G01P 15/02* (2013.01); *G21K 1/06* (2013.01);
(Continued)

(58) Field of Classification Search
CPC ...... G21K 1/006; G21K 1/067; G21K 1/0067; G01C 19/02; G01V 7/00; G01P 15/02; H05H 3/04
See application file for complete search history.

(56) References Cited

U.S. PATENT DOCUMENTS

| 4,992,656 A | 2/1991 | Clauser | |
| 2014/0319329 A1* | 10/2014 | Bidel | G21K 1/006 250/251 |
| 2015/0090028 A1* | 4/2015 | Zahzam | G21K 1/006 73/382 R |

OTHER PUBLICATIONS

Gattobigio et al, "Optically Guided Beam Splitter for Propagating Matter Waves", Physical Review Letters, vol. 109, No. 3, Jul. 1, 2012.*

(Continued)

*Primary Examiner* — David E Smith (57) ABSTRACT

A temporally continuous matter wave beam splitter (14) comprising a plurality of intersecting and interfering laser beam ($k_r$, $k_b$), which act as waveguides for a matter wave beam. The laser beams of the waveguides each have a frequency detuned below a frequency of an internal atomic transition of the matter wave. The matter wave has a wavevector which is an integral multiple of the wavevector of the laser beams within a region of intersection of the laser beams. There is also provided an atomic interferometer (200) comprising such a continuous matter wave beam splitter, and a solid state device comprising such a continuous matter wave beam splitter, which may be part of an atomic interferometer. A cold atom gyroscope, a cold atom accelerometer or a cold atom gravimeter comprising such a solid state device are also provided. There is further provided a quantum computer comprising such a solid state device, wherein atoms of the matter wave beam are in an entangled quantum state. There is also provided a method of splitting a matter wave beam, comprising introducing the (Continued)

matter wave beam into a first temporally continuous laser beam, the frequency of which is detuned below a frequency of an internal atomic transition of the matter wave beam; intersecting and interfering the first continuous laser beam with a second temporally continuous laser beam, the frequency of which is also detuned below the frequency of the internal atomic transition of the matter wave beam; providing the matter wave beam with a wavevector which is an integral multiple of the wavevector of the first and second laser beams within a region of intersection of the laser beams, whereby the laser beams act as waveguides for the matter wave beam.

21 Claims, 8 Drawing Sheets

(51) Int. Cl.
    *G01C 19/02*     (2006.01)
    *G01P 15/02*     (2013.01)
    *H05H 3/04*     (2006.01)
    *G01V 7/00*     (2006.01)

(52) U.S. Cl.
    CPC .............. *G21K 1/067* (2013.01); *H05H 3/04* (2013.01); *G01V 7/00* (2013.01)

(56) References Cited

OTHER PUBLICATIONS

Ovchinnikov et al, "An Atomic Trap Based on Evanescent Light Waves", Journal of Physics B, Atomic Molecular and Optical Physics, Institute of Physics Publishing, Bristol, GB, vol. 24, No. 14, Jul. 28, 1991 p. 3173-3178).*

Fabre et al, "Realization of a Distributed Bragg Reflector for Propagating Guided Matter Waves", Physical Review Letters, 107, 2030401, 2011.*

Fabre et al, "Realization of a Distributed Bragg Reflector for Propagating Guided Matter Waves", Physical Review Letters, 107, 2030401, 2011 (Year: 2011).*

Birkl et al, "Atom Optics with Microfabricated Optical Elements", Optics Communications 191 (2001) 67-81 (Year: 2001).*

Gattobigio et al, "Optically Guided Beam Splitter for Propagating Matter Waves", Physical Review Letters, vol. 109, No. 3, Jul. 1, 2012 (Year: 2012).*

Ovchinnikov et al, "An Atomic Trap Based on Evanescent Light Waves", Journal of Physics B, Atomic and Molecular Physics, Institute of Physics Publishing, Bristol, GB, vol. 24, No. 14, Jul. 28, 1991, p. 3173-3178. (Year: 1991).*

Fabre et al, "Realization of a Distributed Bragg Reflector for Propagating Matter Waves", Physical Review Letters, 107, 2030401, 2011 (Year: 2011).*

McDonald, G.D. et al., "Optically Guided Linear Mach-Zehnder Atom Interferometer," Physical Rev. A vol. 7, pp. 313632/1-313632/5 (Jan. 2013).

Barnett, A.H. et al., "Substrate-Based Atom Waveguide Using Guided Two-Color Evanescent Light Fields," Physical Rev. A vol. 61, No. 2, pp. 023608/1-023608/11 (Feb. 2000).

Search Report for GB Patent App. No. 1416142.6.

Gattobigio, G.L. et al., "Optically Guided Beam Splitter for Propagating Matter Waves," Physical Rev. Letters, vol. 109, No. 3 (Jul. 1, 2012).

Ovchinnikov, Y.B. et al., "An Atomic Trap Based on Evanescent Light Waves," Journal of Physics B, vol. 24, No. 14 (Jul. 28, 1991).

Zhenglu, Duan et al., "Quantum Tunneling Time of a Bose-Einstein Condensate Traversing through a Laser-Induced Potential Barrier," Arxiv.org (Jun. 1, 2010).

Birkl, G. et al., "Atom Optics with Microfabricated Optical Elements," Optics Communications, vol. 191, No. 1-2 (May 1, 2001).

Lauber, T. et al., "Atomic Wave Packet Dynamics in Finite Time-Dependent Optical Lattices; Atomic Wave Packet Dynamics in Finite Time-Dependent Optical Lattices," Journal of Physics B, vol. 44, No. 6 (Feb. 25, 2011).

International Search Report for International App. No. PCT/GB2015/051705.

* cited by examiner

BEAM SPLITTERS

TECHNICAL FIELD

The present invention is in the field of atomic physics and quantum physics, and more particularly, atomic interferometry and matter wave interferometry. In particular, it relates to beam splitters and especially to waveguide diffraction beam splitters for matter waves based on crossed interfering laser beams and matter wave interferometry using such beam splitters.

BACKGROUND ART

The main interest in matter wave interferometers is based on the very high sensitivity of these interferometers to accelerations (including gravitation and rotations) and electromagnetic fields, as described, for example, in A. D. Cronin, J. Schmiedmayer, D. E. Pritchard, "Optics and interferometry with atoms and molecules", Rev. of Mod. Phys. 81, 1051 (2009) (hereinafter called [Ref 1]). Most existing atom interferometers are based on free propagating atoms, which are coherently split by mechanical gratings or non-resonant standing light waves [Ref 1]. On the other hand, there is a great commercial interest in waveguide-type atom interferometers, in which atoms are partially or fully prevented from free falling in a gravitational field and can be integrated into portable atom chips.

Most current waveguide matter-wave interferometers are based on magnetic waveguides. One recent example of such an interferometer based on a double-well beam splitter is described in T. Schumm et al, "Matter-wave interferometry in a double well on an atom chip", Nature 1, 57 (2005) [Ref 2]. The main problem of these beam splitters is that they work only for magnetically trappable atoms. This means that any environmental magnetic fields will essentially perturb such an interferometer. In addition, the local fluctuations of the surface electric currents, which are used to form the trapping magnetic field, limit the coherence time of the atoms in such types of magnetic traps, unless the current-carrying substrate is cooled down to cryogenic temperatures.

Recently, G. L. Gattobigio et al, "Optically guided beam splitter for propagating matter waves", Phys. Rev. Lett. 109, 030403 (2012) [Ref 3] has demonstrated a beam splitter based on two crossed laser beams, which relies on chaotic trajectories of atoms and therefore can't be used for atomic interferometry.

G. D. McDonald et al, "Optically guided linear Mach-Zehnder atom interferometer", Phys. Rev. A, 87, 013632 (2013) [Ref 4] describes ultracold atoms trapped in a single laser beam waveguide. In [Ref 4], splitting of the atoms was performed in a pulsed way, by application to them of an additional optical standing wave. Therefore, this is a temporal (or pulsed) interferometer.

Other background art may be found in the following two documents: Yu. B. Ovchinnikov et al, "An atomic trap based on evanescent light waves", J. Phys. B: At. Mol. Opt. Phys. 24, 3173 (1991) [Ref 5], and A. H. Barnett et al, "Substrate-based atom waveguide using guided two-colour evanescent light fields", Phys. Rev. A 61, 1371 (2000) [Ref 6].

A technical challenge, therefore, is to design and build atom interferometer based devices with unprecedented small size, light weight, low power, high performance and low cost characteristics. Compact cold atom sensors (gravimeters, gradiometers) for ultraprecise measurements of inertial and electromagnetic forces, which are based on all-light waveguide atom interferometers of a new type, offer exciting prospects for a wide range of applications.

SUMMARY OF THE INVENTION

According to a first aspect of the invention, there is provided a continuous matter wave beam splitter comprising a plurality of intersecting and interfering laser beams acting as waveguides for a matter wave beam, wherein the laser beams of the waveguides each have a frequency detuned below a frequency of an internal atomic transition of the matter wave beam, and the matter wave beam has a wavevector which is an integral multiple of the wavevector of the laser beams within a region of intersection of the laser beams.

By "continuous" is meant that the matter wave beam splitter can be maintained continuously in time, and is not temporary. The latter would be the case, for example, if the beam splitter were instead generated by pulses from counter-propagating laser beams.

The matter wave beam may have a wavevector which is not an integral multiple of the wavevector of the laser beams within the waveguides outside the region of intersection of the laser beams because the region of intersection of the laser beams creates a potential well for the atoms of the matter wave beam, which accelerates the atoms within the region of intersection.

In a second aspect of the invention, there is also provided an atomic interferometer comprising a continuous matter wave beam splitter as taught herein.

In a third aspect of the invention, there is provided a solid state device comprising a continuous matter wave beam splitter as taught herein disposed on a surface of the device. The matter wave beam splitter may be part of an atomic interferometer.

A continuous beam splitter as taught herein can be used for temporally continuous matter waves and in continuous atomic interferometers to provide temporally continuous information about measurement parameters, such as accelerations and rotations. This means that there are no dead times when information is lost, which is very important for some applications of such interferometers.

In a fourth aspect of the invention, there is also provided a cold atom gyroscope, a cold atom accelerometer or a cold atom gravimeter comprising such a solid state device.

In a fifth aspect of the invention, there is further provided a quantum computer comprising such a solid state device, wherein atoms of the matter wave beam are in an entangled quantum state.

In a sixth aspect of the invention, there is also provided a method of splitting a matter wave beam comprising: introducing the matter wave beam into a first continuous laser beam, the frequency of which is detuned below a frequency of an internal atomic transition of the matter wave beam; intersecting and interfering the first continuous laser beam with a second continuous laser beam, the frequency of which is also detuned below the frequency of the internal atomic transition of the matter wave beam; providing the matter wave beam with a wavevector which is an integral multiple of the wavevector of the first and second laser beams within a region of intersection of the laser beams, whereby the laser beams act as waveguides for the matter wave beam.

A splitting ratio of the beam splitter can be determined by at least one of the respective polarizations, intensities and/or diameters of the laser beams, as well as by changing the velocity of atoms in the matter wave beam.

The splitting ratio of the beam splitter may be chosen to be substantially equal to 50:50 or may be chosen to be substantially equal to 100:0, so that the beam splitter can act as a mirror.

At least one of the intersecting and interfering laser beams may be bichromatic, that is to say, two-coloured. In some cases, the bichromatic laser beam may have a first frequency which is red-detuned below the frequency of the internal atomic transition of the matter wave beam and a second frequency which is blue-detuned above the frequency of the internal atomic transition of the matter wave beam.

In an embodiment in which the beam splitter is part of a Sagnac interferometer, the bichromatic laser beam may circulate in a circular planar waveguide and intersect orthogonally and interfere with two counter-propagating laser beams, the latter having mutually orthogonal polarisations.

In some embodiments, at least one of the laser beam waveguides may be curved.

The matter wave beam splitter may comprise more than two of said intersecting and interfering laser beam waveguides arranged in a non-planar configuration.

At least one of the laser beams of the waveguides may further intersect a third laser beam having a frequency detuned above the frequency of the internal atomic transition of the matter wave beam, whereby the third laser beam can act as a mirror for the matter wave beam.

Preferred features of the invention are as follows:

A beam splitter, which splits coherently and in a definite proportion a matter wave between several crossed laser beam waveguides.

The method uses diffraction of matter waves at light gratings, which are formed at the region of intersection of the interfering laser beam waveguides.

The main condition for the efficient diffraction of the matter wave at the beam splitter is achieved when the wavevector of the de Broglie matter wave is an integral multiple of the wavevector of light within a region of intersection of the laser beams.

The splitting ratio of the beam splitter can be changed by polarisations, intensities or diameters of the crossed laser beams, as well as by changing the velocity of the guided atoms.

The intersection of N interfering laser beam waveguides produces an N-port matter beam splitter, which is based on Laue diffraction of matter waves on a corresponding light crystal.

Designs of waveguide atomic interferometers of different types, like Michelson, Fabry-Perot, Mach-Zehnder and Sagnac interferometers, based on these beam splitters, are possible. By an "atomic interferometer" is meant an arrangement having the same geometry as a conventional interferometer for electromagnetic waves, but with a matter wave beam substituted for a beam of electromagnetic waves and a beam splitter as taught herein substituted for a conventional beam splitter.

A way of integrating these beam splitters (with a physical size of several micrometers) and corresponding interferometers into planar solid-state atom chips is also possible.

The new waveguide atomic interferometer approach offers significant benefits over competing technologies: it can realise sensors of exquisite sensitivity; has the potential for rapid maturation to high levels of technological readiness; and can be engineered into a small form factor and ruggedized for reliable performance, making it inherently suitable for exploitation in a range of products and at an affordable price.

Atom interferometers can also be used to manipulate atoms in entangled quantum states for quantum computing applications.

The teachings herein allow the design and commercialisation of miniature interferometers, which are integrated into a solid-state (dielectric) substrate with planar optical waveguides (atom chip interferometers) on its surface. The laser light propagates along the waveguides and will form evanescent light waves above the surface of the waveguides, which is then used for guiding ultra-cold atoms along the waveguides.

One of the advantages of a system of integrated waveguide interferometers for sensing or computing applications consists in their compactness. One interferometer can have a size of 10×10 µm, which makes it possible to accommodate one million such interferometers on a substrate with a size of 1×1 cm. This opens great prospects for portable and relatively inexpensive quantum computers. In addition it is possible to fabricate scalable interferometers, e.g. of different dimensions (10 cm×10 cm plus 1 cm×1 cm etc.), providing different sensitivities and hence offering unprecedented dynamic range over competitive offerings.

If the new technology were to be applied to produce a cold atom gyroscope the following accuracies could be expected:

1 cm×1 cm-between $5.8 \times 10^{-9}$ rad s$^{-1}$ Hz$^{-0.5}$ and $5.8 \times 10^{-11}$ rad s$^{-1}$ Hz$^{-0.5}$ 10 cm×10 cm-between $5.8 \times 10^{-10}$ rad s$^{-1}$ Hz$^{-0.5}$ and $5.8 \times 10^{-12}$ rad s$^{-1}$ Hz$^{-0.5}$ If the new technology were to be applied to produce a cold atom accelerometer the following accuracies could be expected:

1 cm×1 cm-between $5 \times 10^{-11}$ m s$^{-1}$ Hz$^{-0.5}$ and $5 \times 10^{-13}$ m s$^{-1}$ Hz$^{-0.5}$ 10 cm×10 cm-between $5 \times 10^{-12}$ m s$^{-1}$ Hz$^{-0.5}$ and $5 \times 10^{-14}$ m s$^{-1}$ Hz$^{-0.5}$ If the new technology were to be applied to produce a cold atom gravimeter the following accuracies could be expected:

1 cm×1 cm-between $5 \times 10^{-9}$ Gal Hz$^{-0.5}$ and $5 \times 10^{-11}$ Gal Hz$^{-0.5}$ 10 cm×10 cm-between $5 \times 10^{-10}$ Gal Hz$^{-0.5}$ and $5 \times 10^{-12}$ Gal Hz$^{-0.5}$ (1 Gal=1 cm s$^{-2}$)

The upper and lower limits are for different numbers of atoms and different atomic velocities.

The new interferometers use waveguides for matter waves, which are formed by laser beams, the frequency of which is detuned above or below the main electron transition of the atom. A principal advantage of waveguide atom interferometers is the possibility of using ultraslow atoms, with velocities around 1 mm/s. This increases the sensitivity of these interferometers to inertial forces, compared to standard atom interferometers based on thermal or free falling atoms.

A central advantage of the waveguide is that it prevents ballistic expansion of the propagating atoms, which makes it possible to achieve large propagation times. The waveguides also prevent atoms from falling down in a gravitational field, which provides an essential increase of the sensitivity of these interferometers in measurements of horizontal components of gravity and accelerations.

A feature of the new waveguide interferometer is the new waveguide interference beam splitter that underpins the development of an atom chip all-optical waveguide atom interferometer.

The sensitivity of the new waveguide atom interferometers to inertial forces is determined by the same factors (total area or interrogation time) as for conventional free-fly atom interferometers. The generic technology is hence well known and low risk.

Proof of principle is possible via free space experiments for a Michelson atom interferometer configuration. The integration of such an interferometer into an atom chip can use standard fabrication processes and materials.

A principal advantage of the new waveguide interferometers (over other quantum based interferometers) is their ability to provide longer interrogation times while the atoms are guided, plus there is no divergence of the atomic cloud due to its final temperature. This provides superior performance and this performance can be traded to produce significantly smaller devices with commensurate performance to "free-fly" atom systems.

The new technology offers accuracies that are realisable in a form factor that is significantly smaller than currently available non-quantum based products such as ring laser gyroscopes and fibre optic gyroscopes. In optical fibre gyroscopes, large coils with many turns are used; therefore, their effective area is the area of one loop times the number of turns, which gives a huge total area. In addition, the photon flux in optical gyroscopes is also very high, which essentially reduces the quantum projection noise. A significant advantage of cold atom gyroscopes is that they can provide similar sensitivity to rotation at much smaller size of the device. This is because of the very large mass of the atoms.

Potential applications of the technology include gyroscopes (rotation and rotation rate sensors), accelerometers, gravimeters, electric and magnetic field sensors, gradiometers, quantum computing and quantum simulation.

Likely users of the technology include in the space and industrial, scientific and medical fields.

BRIEF DESCRIPTION OF THE DRAWINGS

Embodiments of the present invention are described below, by way of example only, with reference to the accompanying drawings, in which.

DETAILED DESCRIPTION

Figure 1:
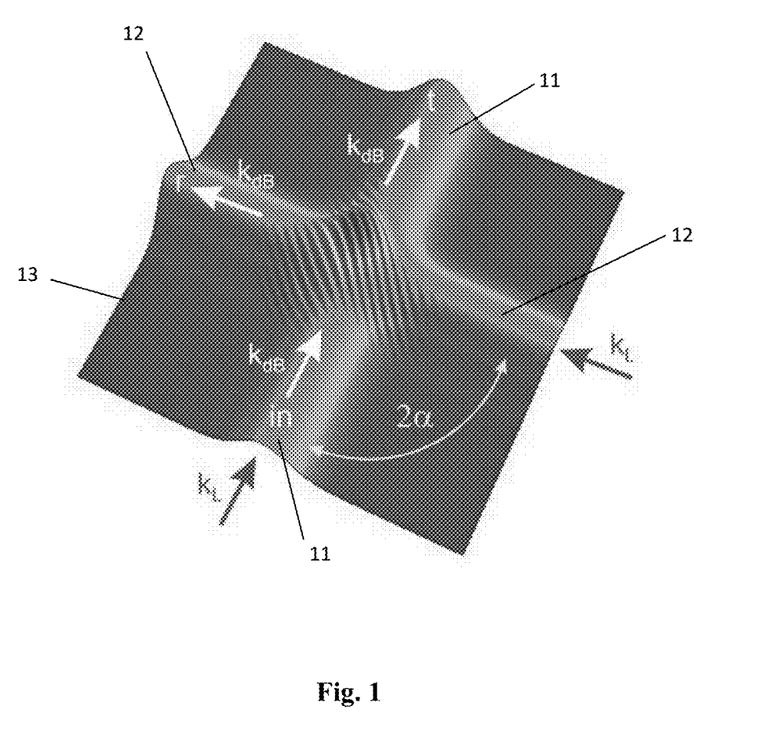
FIG. 1 is an isometric schematic view of a Bragg beam splitter for matter waves based on two crossed optical waveguides.

Referring firstly to FIG. 1, we are considering waveguides for matter waves, which are formed by focussed laser beams, both labelled $k_L$ in FIG. 1, the frequency of which is detuned sufficiently far above or below one of the internal atomic transitions of the matter waves so as not to induce such an atomic transition. Such a waveguide can be single-mode or multimode, which depends on the intensity and diameter of the laser beam.

Consider two such identical waveguides, labelled 11 and 12 in FIG. 1, which intersect each other at an angle of $2\alpha$ in a region labelled 13. The interference of the laser beams in the region 13 of their intersection produces a standing light wave, the angle of which with respect to the waveguides is exactly equal to $\pm\alpha$ and its period is equal to $d=\pi/k/\sin\alpha$, where $k=2\pi/\lambda$ is the wave vector of the laser field. The amplitude of the standing wave depends on a degree of interference between the crossed laser beams and can be accurately tuned by their mutual polarisations or their intensities.

This standing wave presents for atoms a matter wave beam splitter 13 in the form of a phase grating, which can coherently split the incident guided matter wave, labelled "$k_{dB}$ in" in FIG. 1, between the two waveguides by Bragg diffraction into reflected and transmitted components, respectively labelled "$k_{dB}$ r" and "$k_{dB}$ t" in FIG. 1 . The splitting ratio of the grating depends on the velocity of the atoms, the amplitude of the grating and its total length.

It is easy to show that such a grating acts as a Bragg reflector for atoms with velocities $$v=Nv_r, \qquad (1)$$

where $v_r=\hbar k/m$ is the one-photon recoil velocity of the atom, m is the mass of the atom, and N is a whole number, which characterises the order of the Bragg diffraction.

Formula (1) describes the Bragg condition for the diffraction of atoms at the light grating. The velocity v in that formula corresponds to the velocity of atoms inside the grating. In general this velocity can be different from the velocity of atoms in the waveguides. This is due to the fact that the waveguide beam splitter includes a light grating and a potential well, which is formed by the crossing laser beams.

The theory of Bragg gratings is well established. According to calculations, for a grating formed by crossed laser beams of radius $w=4$ µm and depth of the standing wave potential of $0.1E_r$, where $E_r=mv_r^2/2$, in the case of Bragg resonance (1) at $N=1$, the reflectivity of Rb atoms is equal to 100%. For a depth of the standing wave potential of $0.05E_r$, the corresponding reflection is about 50%.

Figure 2:
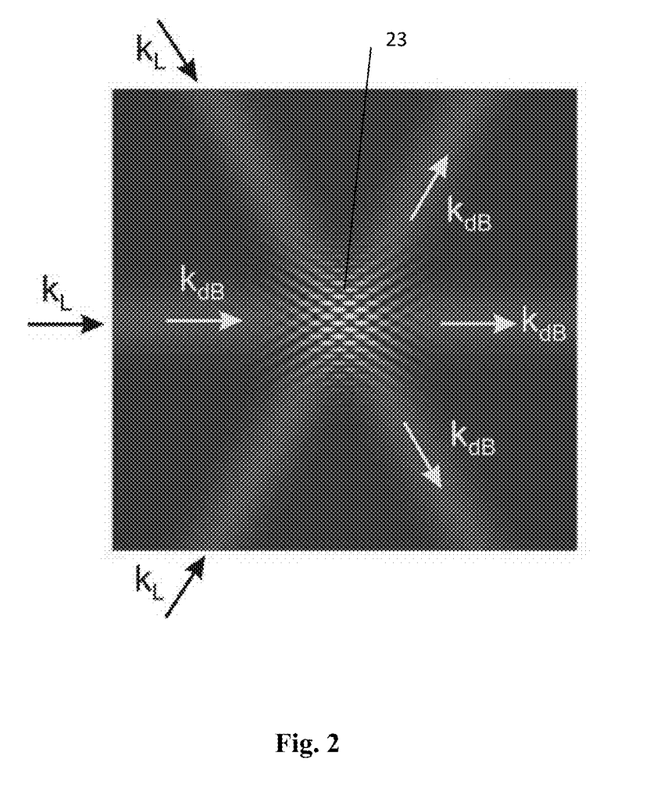
FIG. 2 is a plan schematic view of a three-port waveguide beam splitter for matter waves.

In general, the intersection and interference of M laser beams forms an M-port beam splitter for guided matter waves. In that case the interference structure of the beams forms a light crystal, which splits matter waves, the wave vector of which is equal to the wavevector of light, between all the M ports of the beam splitter. Note that the intersecting light beams of such an M-port beam splitter can have any directions in 3D-space. As shown in FIG. 2, for example, the intersection and interference of 3 laser beams labelled $k_L$ forms a 3-port beam splitter labelled 23 for guided matter waves, labelled $k_{dB}$.

These Bragg waveguide beam splitters can be used for compact waveguide interferometers of different types. The accompanying drawings show some possible designs of Mach-Zehnder (see FIG. 3) and Michelson (see FIG. 4) waveguide interferometers, based on the beam splitters just described.

Figure 3:
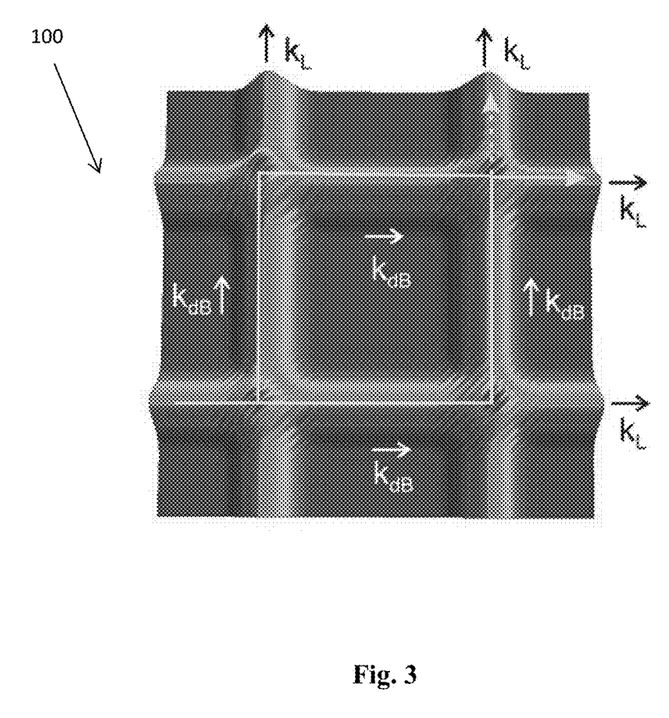
FIG. 3 is a plan schematic view of a waveguide Mach-Zehnder interferometer for matter waves, formed by four crossed interfering laser beams.

In FIG. 3, the line shows the trajectory of the guided atoms labelled $k_{dB}$ through a Mach-Zehnder interferometer 100 and the paths of the laser beams which establish the waveguides are labelled $k_L$.

Figure 4:
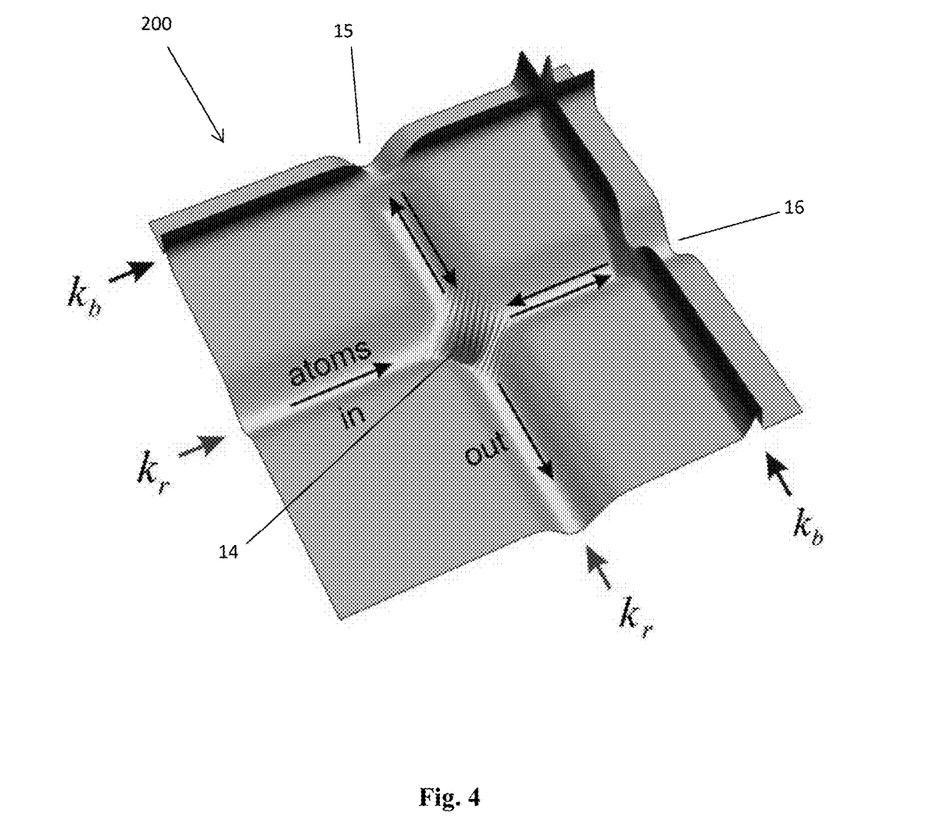
FIG. 4 is an isometric schematic view of a waveguide Michelson interferometer for matter waves.

In the Michelson interferometer 200 of FIG. 4, optical potentials are formed by four non-resonant laser beams as follows: two crossed laser waveguides labelled $k_r$, which are red-detuned from the main internal atomic transition, form an attractive (negative) potential in the region labelled 14, and two additional blue-detuned laser beams labelled $k_b$, form a repulsive (positive) potential, serving as retro-reflective mirrors for the guided atoms in regions labelled 15 and 16.

Other types of interferometers, like Fabry-Perot, Sagnac and others, can also be easily implemented.

According to the condition (1) above, the waveguide interferometers use very slow atoms (v~0.1-1 cm/s). Use of such slow atoms essentially increases the sensitivity of these interferometers to inertial (acceleration, rotation) and electromagnetic forces.

The sensitivity of such interferometers based on Rb atoms, with a size of 1 cm by 1 cm and a flux of atoms ~$10^6$ atom/s, to gravity and accelerations can be as high as $5 \times 10^{-11}$ m $s^{-2}$ $Hz^{-0.5}$, and the corresponding sensitivity to rotations is expected to be about $6 \times 10^{-9}$ rad $s^{-1}$ $Hz^{-0.5}$. The sensitivity of such an interferometer to gradients of magnetic fields is expected to be about $4 \times 10^{-15}$ T $m^{-1}$ $Hz^{-0.5}$.

Figure 5:
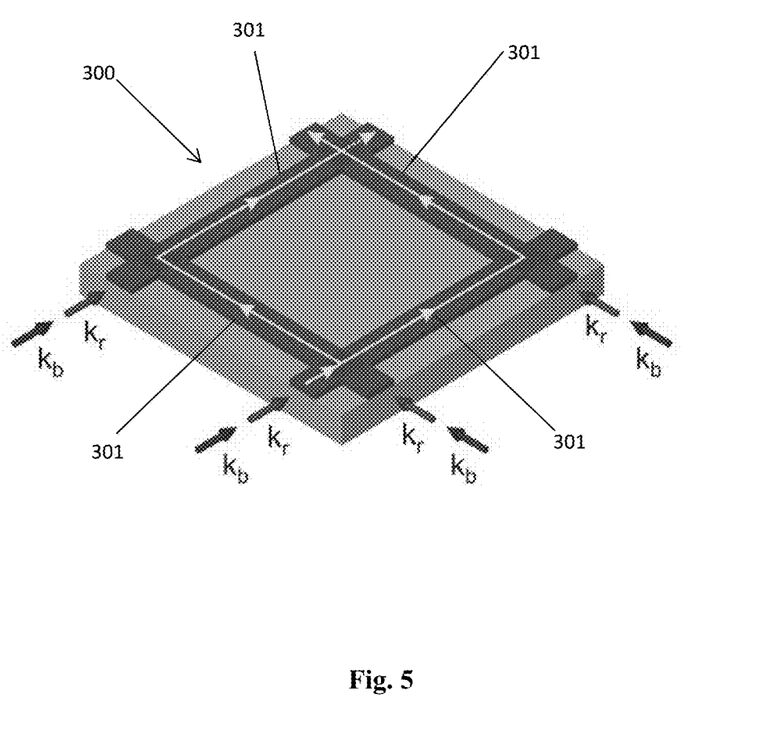
FIG. 5 is an isometric schematic view of an atom chip waveguide Mach-Zehnder interferometer for matter waves based on two-colour evanescent light waves, which propagate along optical surface waveguide structures.

Using bichromatic (i.e. two-colour) surface light traps and corresponding surface waveguides for matter waves, compact, integrated versions of these interferometers can be produced on a surface of a solid-state atom chip, an example of which is shown in FIG. 5. In FIG. 5, two-colour evanescent light waves, labelled $k_r$ and $k_b$, propagate along optical surface waveguide structures 301 of an atom chip waveguide Mach-Zehnder interferometer 300 for matter waves. The arrowed line shows the trajectory of the guided atoms.

The sensitivity of these interferometers makes them very attractive for different practical applications. There are several advantages of such integrated interferometers. First, the optically guided laser fields are not divergent over long distances. Second, the dipole potential of the surface optical waveguides is essentially compressed in a direction perpendicular to the surface of the substrate, which makes it possible to use these waveguides in a single mode regime without being restricted by the presence of a gravitational force.

Another prospective application of these waveguide beam splitters is quantum computing based on entangled atomic states. An array of coupled atom interferometers (interferometers with common arms or beam splitters) based on such a beam splitter can be used for making a quantum computer. As soon as the depth of the light grating of the splitter depends on the internal atomic state, these splitters can be used for controlled interaction between the atoms propagating inside the optical waveguides, the strength of which depends on the internal state of the atom. The small size of the proposed waveguide beam splitter and the possibility of its integration into a solid-state chip offers a possibility to make the whole quantum processor very compact.

Figure 6:
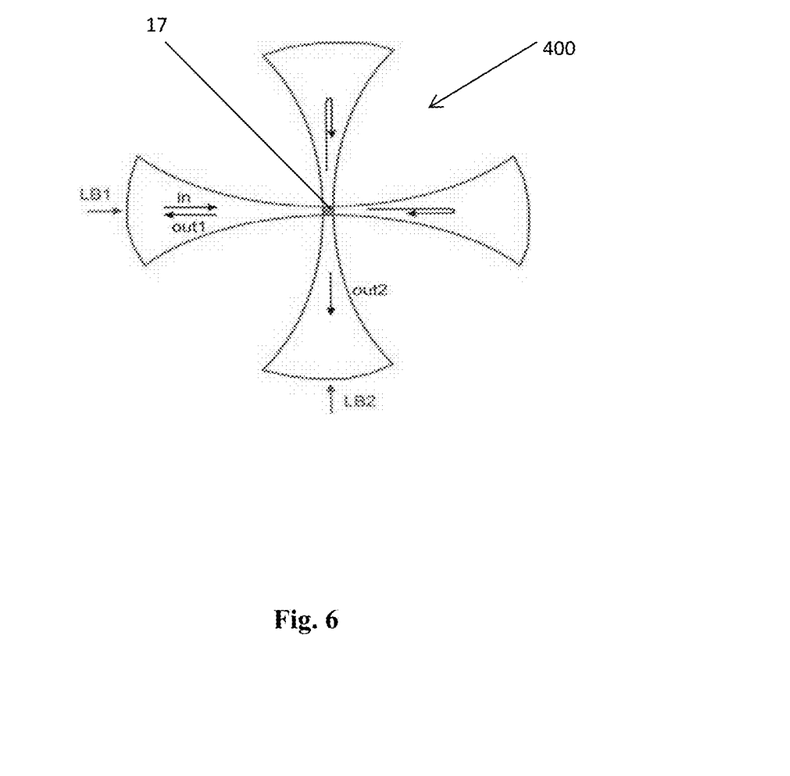
FIG. 6 is a plan schematic view of a Michelson waveguide interferometer for matter waves based on two crossed Gaussian laser beams.

The simplest waveguide interferometer, based on free-propagating laser beams, is a Michelson interferometer 400, as shown in FIG. 6. It is formed by two monochromatic Gaussian laser beams, labelled LB1 and LB2 in FIG. 6, which intersect each other in the region 17 of their waists. Both beams are red-frequency-detuned from the internal atomic transition, such that they trap and guide atoms.

The interference between the laser beams in the crossing region produces an optical lattice, which works as a Bragg beam splitter for atoms, which propagate along the beams with corresponding velocities. Initially, the atoms propagate along one of the laser beams LB1 towards the crossing region, as indicated by the arrow labelled "in" in FIG. 6. At the crossing region of the laser beams, these atoms are coherently split into two partial waves, which then propagate along the LB1 and LB2 beams. These atoms are slowed down by the restoring optical dipole force along the laser beams and at some point reverse their direction of motion. After that, the two returning partial waves experience interference with each other at the Bragg beam splitter and produce the two output beams, labelled "out1" and "out2", which contain information about the phases of the interfering de Broglie partial waves and all corresponding information about the external electromagnetic and inertial forces.

Figure 7:
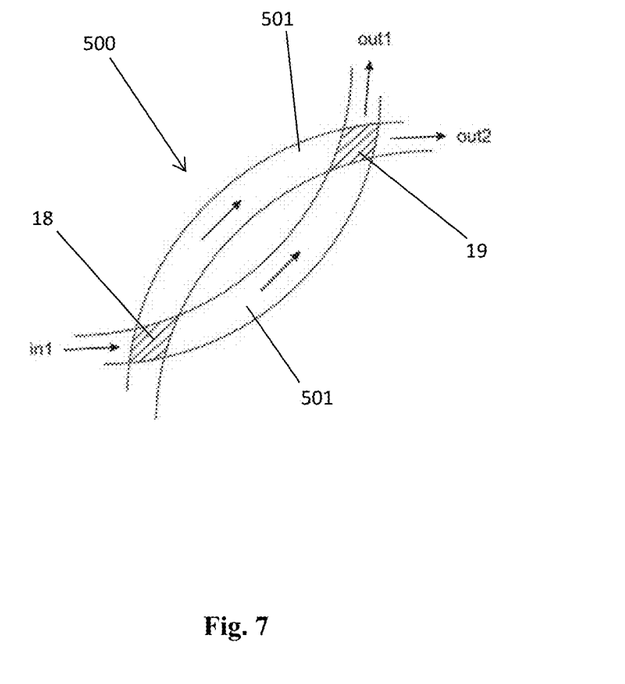
FIG. 7 is a plan schematic view of an integrated Mach-Zehnder waveguide interferometer for matter waves.

We shall now consider further the integrated version of waveguide optical interferometers for matter waves, which are based on planar optical waveguides and bichromatic evanescent light waves, as described above. One of the main advantages of such integrated waveguides for atoms is that they can be curved. This opens new very attractive opportunities. For example, the Mach-Zehnder interferometer 500 of FIG. 7 can use only two beam splitters in the regions labelled 18 and 19 in FIG. 7, instead of four beam splitters in the Mach-Zehnder interferometer 300 based on free propagating laser beams of FIG. 5 because the waveguides 501 are curved. The guided matter waves then follow the paths of the arrows labelled "in1", "out1" and "out2" in FIG. 7.

Figure 8:
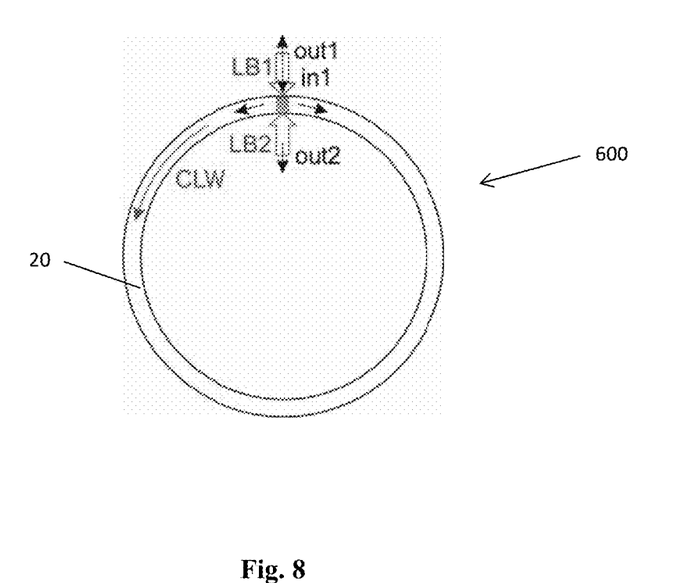
FIG. 8 is a plan schematic view of an integrated Sagnac waveguide interferometer for matter waves.

FIG. 8 shows an integrated Sagnac waveguide interferometer 600 for matter waves. The main part of it is a circular planar waveguide 20, which guides two optical running modes of different frequency. This light forms a bichromatic evanescent optical field "CLW" outside the waveguide, which is used to guide cold atoms along the circular waveguide. The coupling of cold atoms to the circular waveguide is performed with a special Bragg beam splitter, which is produced by three crossed laser beams, labelled "LB1", "LB2" and "CLW". It is important that the beams "LB1" and "LB2" are counter-propagating and orthogonal to the circular light wave "CLW". In that case, the interference of the "LB1" and "LB2" beams with the "CLW" wave produces two orthogonal optical lattices, which split the incident atoms labelled "in1" into two partial matter waves, one of which propagates along the circular waveguide clockwise, and the other one anticlockwise. After a full turn of these counter-propagating partial matter waves, they interfere at the Bragg beam splitter and form the two complementary output atomic beams of the interferometer, labelled "out1" and "out2". Such a Sagnac atom interferometer is sensitive to its rotation with respect to its axis of symmetry, but is absolutely insensitive to linear accelerations, which is absolutely important for quantum gyroscopes. Another unique property of this Sagnac waveguide interferometer is that it is insensitive to the phase shifts of the de Broglie wave, which are generated by the trapping optical potential, because of exactly the same pass of the two partial matter waves along the same circular waveguide.

The laser beams "LB1" and "LB2" ideally should not interfere with each other to avoid an additional standing light wave along these beams, which might essentially change the propagation of atoms along these beams via their Bragg diffraction. This can be achieved by mutually orthogonal polarisation of these beams or by other means. The "LB1" and "LB2" beams can be either bichromatic evanescent light fields, or free propagating laser beams, which are essentially overlapped with the evanescent light field of the circular resonator "CLW".

The coupling efficiency of the atoms to the ring waveguide can be changed by varying the light intensities of the "LB1" and "LB2" beams. In particular, these can be changed by a very small amount, which also means very little decoupling of atoms from the ring resonator. This means that atoms can run many turns in the ring waveguide before they are decoupled, which should increase the sensitivity of the Sagnac interferometer proportionally to the number of turns of the circular waveguide, assuming the same output flux of atoms in the matter wave beam.

Figure 9:
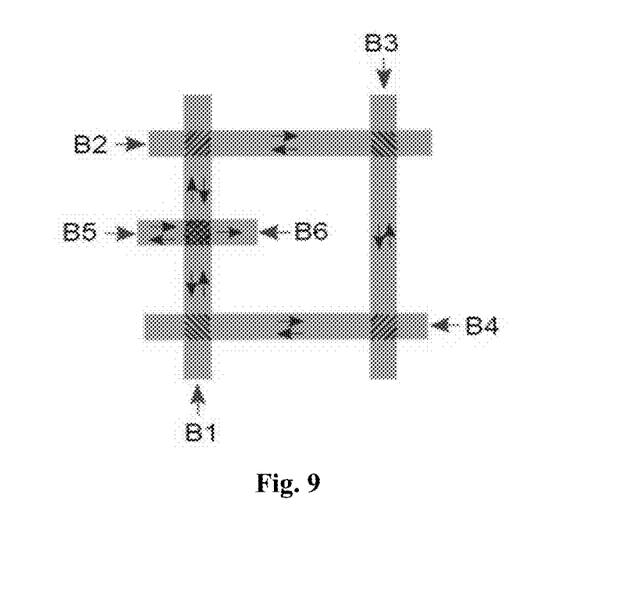
FIG. 9 is a plan schematic view of an all-optical Sagnac waveguide interferometer for matter waves based on straight laser beams.

FIG. 9 shows the general structure of an all-optical waveguide Sagnac interferometer for matter waves. It consists of a waveguide for atoms in the form of a closed figure, e.g. a square as shown, and, which is produced by four laser beams (B1, B2, B3, B4) which propagate either clockwise or anti-clockwise. All these laser beams have the same frequency and the same polarisation. For example, all the beams can be linearly polarised, such that the direction of the polarisation is perpendicular to the plane of the ring-like waveguide. At the four regions of intersection of the beams B1, B2, B3 and B4 the interference between them leads to the formation of standing light waves, which act on guided atoms as Bragg gratings of 100% reflectivity, provided that the longitudinal velocity of the atoms satisfies the Bragg condition. Two additional counter-propagating laser beams B5 and B6 intersect one of the arms B1 of the waveguide and form a symmetric Bragg beam splitter (SBS) for guided matter waves. The beams B5 and B6 have the same optical frequency as the other beams. The beams B5 and B6 are used for guiding matter waves and also for coupling and outcoupling of them to or out of the waveguide of the Sagnac interferometer. To avoid the interference between the beams B5 and B6, they have orthogonal polarisations. For example, they can have orthogonal linear polarisations, which are at +/−45 degrees to the plane of the interferometer. The partial interference of these beams to the beam B1 leads to the production of two orthogonal standing waves (Bragg gratings) at the region of intersection of the beams B5, B6 and B1. Such a crossed Bragg grating splits the atoms, which initially propagate along the waveguide B5, into two partial waves, one of which propagates along the B1 waveguide while the other propagates in the opposite direction. After full propagation around the waveguide in two opposite directions, the two partial matter waves interfere at the symmetric beam splitter (SBS), where the atoms are decoupled from the Sagnac interferometer either in B5 or B6 input/output ports of the SBS, which depends on the relative phase of the partial matter waves, and therefore on the rotational speed of the Sagnac interferometer.

The coupling and outcoupling strength of the SBS can be adjusted by changing the intensity of the laser beams B5 and B6, which changes the potential depth of the corresponding Bragg gratings. To avoid decrease of the atom guiding efficiency of the B5 and B6 beams at low intensities, the beams B5 and B6 can be superimposed with an additional beam of different frequency, which provides guiding of atoms but does not form a Bragg grating at the intersection region with the B1 beam.

The same principle of the waveguide Sagnac interferometer for matter waves based of straight waveguides can be applied to the integrated version of the interferometers, which were discussed earlier.

The shape of the figure formed by the four waveguides in FIG. 9 may be other than a square e.g. rectangular or parallelepipedal. In a modification three laser beams define a triangular figure. Alternatively, five or more laser beams define a corresponding polygonal figure.

All optional and preferred features and modifications of the described embodiments and dependent claims are usable in all aspects of the invention taught herein. Furthermore, the individual features of the dependent claims, as well as all optional and preferred features and modifications of the described embodiments are combinable and interchangeable with one another.

The disclosures in British patent application number 1410298.2, from which the present application claims priority, and in the abstract accompanying this application are incorporated herein by reference.

The invention claimed is:

1. A continuous matter wave beam splitter comprising a plurality of intersecting and interfering laser beams wherein the laser beams have at least one common frequency and a matter wave beam, the laser beams being arranged to act as waveguides for the matter wave beam, wherein:
   the laser beams have a frequency detuned below a frequency of an internal atomic transition of the matter wave beam; and
   the matter wave beam has a wavevector which is an integral multiple of the wavevector of the laser beams within a region of intersection of the laser beams.

2. A continuous matter wave beam splitter according to claim 1, wherein a splitting ratio of the beam splitter is determined by at least one of a respective polarization, intensity, or diameters of at least one of the laser beams, or velocity of atoms in the matter wave beam.

3. A continuous matter wave beam splitter according to claim 1, wherein a splitting ratio of the beam splitter is substantially equal to 50:50.

4. A continuous matter wave beam splitter according to claim 1, wherein a splitting ratio of the beam splitter is substantially equal to 100:0, whereby the beam splitter can act as a mirror.

5. A continuous matter wave beam splitter according to claim 1, wherein at least one of the intersecting and interfering laser beams is bichromatic.

6. A continuous matter wave beam splitter according to claim 5, wherein the bichromatic laser beam has a first frequency which is red-detuned below a frequency of the internal atomic transition of the matter wave beam and a second frequency which is blue-detuned above the frequency of the internal atomic transition of the matter wave beam.

7. A continuous matter wave beam splitter according to claim 5, wherein the bichromatic laser beam circulates in a circular planar waveguide and intersects orthogonally and interferes with two counter-propagating laser beams, the latter having mutually orthogonal polarisations.

8. A continuous matter wave beam splitter according to claim 1, wherein at least one of the laser beams has a waveguide that is curved.

9. A continuous matter wave beam splitter according to claim 1, comprising more than two of said intersecting and interfering laser beams, the laser beams having waveguides arranged in a non-planar configuration.

10. A continuous matter wave beam splitter according to claim 1, comprising first, second, and third laser beams, wherein at least one of the first and second laser beams intersects the third laser beam, and the third laser beam having a frequency detuned above the frequency of the internal atomic transition of the matter wave beam, whereby the third laser beam provides a mirror for the matter wave beam.

11. An atomic interferometer according to claim 10, comprising at least one of a Michelson, Fabry-Perot, Mach-Zehnder or Sagnac interferometer.

12. A continuous matter wave beam splitter according to claim 1, further comprising a surface upon which the wave matter beam is situated.

13. The continuous matter wave beam splitter of claim 12, wherein the surface on which the matter wave beam splitter is situated comprises a cold atom gyroscope, a cold atom accelerometer, or a cold atom gravimeter.

14. The continuous matter wave beam splitter of claim 12, wherein the surface on which the matter wave beam splitter is situated comprises a quantum computer, wherein atoms of the matter wave beam are in an entangled quantum state.

15. A method of splitting a matter wave beam, comprising:
    introducing the matter wave beam into a first continuous laser beam, the frequency of which is detuned below a frequency of an internal atomic transition of the matter wave beam;
    intersecting and interfering the first continuous laser beam with a second continuous laser beam having at least one common frequency with as the first laser beam;
    providing the matter wave beam with a wavevector which is an integral multiple of a wavevector of the first and second laser beams within a region of intersection of the laser beams, whereby the laser beams act as waveguides for the matter wave beam.

16. The method according to claim 15, further comprising selecting a splitting ratio of the matter wave beam by adjusting at least one of a respective polarization, intensity or diameter of at least one of the first or second laser beams, or velocity of atoms in the matter wave beam.

17. The method according to claim 15, further comprising providing at least one of the first or second laser beams with a second frequency detuned from the frequency of the internal atomic transition of the matter wave beam, thereby making at least one of the first or second laser beams bichromatic.

18. The method according to claim 17, further comprising blue-detuning the second frequency above the frequency of the internal atomic transition of the matter wave beam.

19. The method according to claim 15, further comprising curving the waveguides of at least one of the first and second laser beams.

20. The method according to claim 15, further comprising intersecting at least one of the first and second laser beams with a third laser beam having a frequency detuned above the frequency of the internal atomic transition of the matter wave beam, thereby reflecting the matter wave beam from the third laser beam.

21. The method according to claim 15, further comprising preparing atoms of the matter wave beam in an entangled quantum state.

* * * * *